(12) United States Patent
Wieland et al.

(10) Patent No.: US 7,150,866 B2
(45) Date of Patent: Dec. 19, 2006

(54) CATALYST FOR AUTOTHERMAL REFORMING OF HYDROCARBONS WITH INCREASED WATER GAS SHIFT ACTIVITY

(75) Inventors: Stefan Wieland, Offenbach (DE); Frank Baumann, Alzenau (DE)

(73) Assignee: Umicore AG & Co. KG, Hanau (DE)

( * ) Notice: Subject to any disclaimer, the term of this patent is extended or adjusted under 35 U.S.C. 154(b) by 232 days.

(21) Appl. No.: 10/644,377

(22) Filed: Aug. 20, 2003

(65) Prior Publication Data

US 2004/0063577 A1 Apr. 1, 2004

(30) Foreign Application Priority Data

Aug. 26, 2002 (EP) .................................. 02019014

(51) Int. Cl.
*C01B 3/40* (2006.01)
*B01J 23/40* (2006.01)
*B01J 23/42* (2006.01)
*B01J 23/46* (2006.01)

(52) U.S. Cl. ...................... 423/652; 422/211; 422/222; 423/651; 502/73; 502/74; 502/207; 502/242; 502/243; 502/249; 502/250; 502/261; 502/262; 502/302; 502/325; 502/328; 502/330; 502/332; 502/334; 502/339

(58) Field of Classification Search ................ 502/339, 502/73, 74, 207, 242, 243, 249, 250, 261, 502/262, 302, 325, 328, 330, 332, 334; 423/457, 423/651; 422/211, 222
See application file for complete search history.

(56) References Cited

U.S. PATENT DOCUMENTS

| | | | |
|---|---|---|---|
| 4,415,484 A | 11/1983 | Setzer et al. | |
| 5,177,041 A | 1/1993 | Horiuchi et al. | |
| 5,459,119 A | 10/1995 | Abe et al. | |
| 6,436,363 B1 | 8/2002 | Hwang et al. | |
| 2001/0016118 A1 | 8/2001 | Haga et al. | |
| 2002/0007595 A1 | 1/2002 | Maier-Roeltgen et al. | |
| 2002/0009408 A1 | 1/2002 | Wieland et al. | |
| 2002/0172630 A1* | 11/2002 | Ahmed et al. .............. | 422/190 |

FOREIGN PATENT DOCUMENTS

| | | |
|---|---|---|
| DE | 197 27 841 A1 | 1/1999 |
| DE | 100 62 662 A1 | 7/2001 |
| EP | 0 112 613 B1 | 7/1984 |
| EP | 0462 593 A1 | 12/1991 |
| EP | 1 157 968 A1 | 5/2001 |

(Continued)

*Primary Examiner*—Wayne A. Langel
(74) *Attorney, Agent, or Firm*—Kalow & Springut LLP; John J. Santalone, Esq.

(57) ABSTRACT

The invention relates to a catalyst and a process for the autothermal, catalytic steam reforming of hydrocarbons using the catalyst. The catalyst has a multilayer structure and comprises a lower catalyst layer located directly on a support body and an upper catalyst layer located on the lower catalyst layer, with the lower catalyst layer preferentially catalysing the partial oxidation and the upper catalyst layer preferentially catalysing steam reforming. In a further embodiment, a three-layer catalyst having a further catalyst layer for the carbon monoxide conversion (water gas shift reaction) is described. Each catalyst layer comprises at least one platinum group metal on an oxidic support material.

Figure 1:
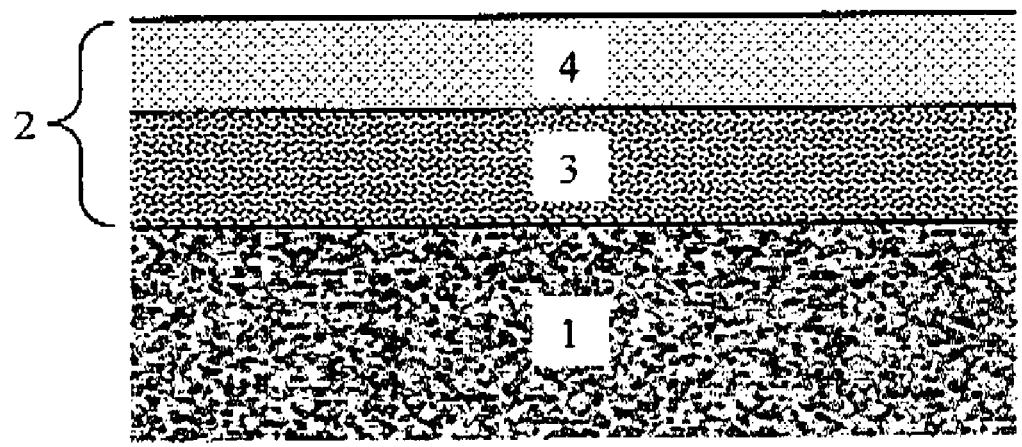

The steam reforming process is carried out in an adiabatic process by passing a feed mixture of hydrocarbons, oxygen and water or water vapour which has been heated to a preheating temperature over the multilayer catalyst.

Catalyst and process are used for producing hydrogen-containing fuel gases in reformer systems, preferably for fuel cells.

11 Claims, 1 Drawing Sheet

FOREIGN PATENT DOCUMENTS

| | | |
|---|---|---|
| WO | WO 98/55227 | 12/1998 |
| WO | WO 99/33567 | 7/1999 |
| WO | WO 99/48805 | 9/1999 |
| WO | WO 02/18269 | 3/2002 |

* cited by examiner

CATALYST FOR AUTOTHERMAL REFORMING OF HYDROCARBONS WITH INCREASED WATER GAS SHIFT ACTIVITY

The invention relates to a multilayer catalyst for producing hydrogen by autothermal steam reforming. The invention further relates to a process for the autothermal steam reforming of hydrocarbons using this catalyst. Here, a feed mixture of hydrocarbons, oxygen and water or water vapour which has been heated to a preheating temperature is passed over a multilayer catalyst which is able to catalyse both the partial oxidation and the steam reforming of hydrocarbons. The process is used for producing hydrogen or hydrogen-containing fuel gases in reformer systems, preferably for fuel cells.

It is known that hydrogen can be produced by reacting hydrocarbons at high temperatures in the presence of water vapour over a suitable catalyst to form hydrogen, carbon monoxide and carbon dioxide. This reaction (also referred to as "steam reforming") is strongly endothermic and proceeds, for example, according to the following reaction equation:

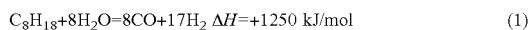

$$C_8H_{18}+8H_2O=8CO+17H_2 \quad \Delta H=+1250 \text{ kJ/mol} \quad (1)$$

A characteristic parameter for the steam reforming reaction (1) is the steam/carbon ratio S/C. In the reaction equation (1), S/C is equal to 1.

A further known possible way of producing hydrogen is catalytic partial oxidation (CPO). Here, the hydrocarbons are reacted in the presence of oxygen over a catalyst to form carbon monoxide and hydrogen according to the reaction equation for the partial oxidation (2):

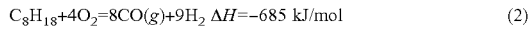

$$C_8H_{18}+4O_2=8CO(g)+9H_2 \quad \Delta H=-685 \text{ kJ/mol} \quad (2)$$

An important parameter for the partial oxidation is the air index $\lambda$, which is defined as the ratio of the number of moles of oxygen used to the number of moles of oxygen required for total oxidation (cf. reaction equation (3)):

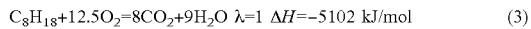

$$C_8H_{18}+12.5O_2=8CO_2+9H_2O \quad \lambda=1 \quad \Delta H=-5102 \text{ kJ/mol} \quad (3)$$

For complete conversion of the hydrocarbon into carbon monoxide and hydrogen in accordance with the equation (2), an air index $\lambda$ of <1, ideally $\lambda=4/12.5=0.32$, is required.

The present invention is concerned with a further possible way of obtaining hydrogen, namely autothermal steam reforming. This process combines steam reforming (equation (1)) with catalytic, partial oxidation (equation (2)), with the exothermic, partial oxidation providing the heat of reaction necessary for the endothermic steam reforming. The feed mixture can in this case be preheated to a preheating temperature. The product mixture is in thermodynamic equilibrium at the temperature prevailing at the reactor outlet. Autothermal steam reforming combines the advantages of catalytic, partial oxidation (good starting behaviour) with those of steam reforming (high hydrogen yields). The process is thus well suited to on-board generation of hydrogen for mobile fuel cell systems and also for use in compact reformers for stationary fuel cell plants.

Catalyst systems for autothermal reforming of hydrocarbons are known. The prior art is as follows:

U.S. Pat. No. 4,415,484 discloses a catalyst for use in an autothermal reforming reactor. The catalyst comprises from 0.01 to 6% of rhodium and from 10 to 35% of calcium oxide on an aluminium oxide support which additionally contains about 3–15% of magnesium oxide. The catalyst is used in the form of pellets and has a particularly low susceptibility to formation of carbon deposits at low oxygen/carbon ratios. A typical catalyst system for carrying out autothermal reforming comprises, according to this document, an iron oxide catalyst for partial oxidation over about one third of its length and the rhodium catalyst described over two thirds of its length. A multilayer catalyst structure is not described.

WO 98/55227 describes a bifunctional catalyst for the partial oxidation of hydrocarbons, which displays activity for the dehydrogenation of hydrocarbons and is also capable of selectively oxidizing the hydrocarbon chain. The dehydrogenation activity is provided by metals of group 8 of the Periodic Table, while the selective oxidation is effected by ionized oxygen. The source of ionized oxygen comprises oxides which crystallize with a fluorite structure or a perovskite structure, for example zirconium oxide, cerium oxide, bismuth oxide, etc. A preferred catalyst is, for example, Pt/CeGdO. It is used in the form of pellets having diameters of from 1.125 to 1.5 inches (2.8 to 3.8 cm).

WO 99/48805 describes a process for the catalytic production of hydrogen by means of a self-maintaining, partial oxidation and steam reforming of hydrocarbons, in which a mixture of the hydrocarbons and an oxygen-containing gas and optionally steam is reacted over a catalyst comprising rhodium dispersed on a support material containing cerium and zirconium as cations. The catalyst is used in granulated form. A multilayer structure of the catalyst is not described.

DE 197 27 841 A1 describes a process and an apparatus for the autothermal reforming of hydrocarbons, in which the fuel is fed via a feed device to a two-stage reforming reactor. The resulting reformate is passed through a heat exchanger in countercurrent to starting materials for reforming conveyed from the outside inward so that heat exchange occurs. The fuel fed in via the feed device is introduced directly together with the starting material to the catalyst-containing reaction zone in which combustion and reforming or catalysis is carried out. The reforming reactor contains a catalyst-coated honeycomb body in its upper region and a catalyst-coated bed in its lower region. A honeycomb body can also be used in place of the bed. Here too, a multilayer structure of the catalyst is not described.

EP 112 613 B1 describes a process for the autothermal reforming of hydrocarbons, in which the partial oxidation occurs in Zone 1 and steam reforming occurs physically separably in Zone 2. Pt- and Pd-containing catalysts are used for the partial oxidation and catalysts containing noble metals are used for the steam reforming. A multilayer structure of the catalyst is not disclosed.

WO 99/33567 describes catalysts for the partial oxidation of hydrocarbons whose monolithic supports possess a multilayer structure having differing porosities. In this document, the multilayer structure does not apply to the catalyst itself, but to the support substrate.

DE 100 62 662 A1 discloses a multilayer catalyst system for the reforming of methanol. The catalyst system comprises a first catalytic component which is based on copper oxide and zinc oxide and, as lower layer, catalyses mainly the steam reforming and also a second, upper catalytic layer which contains a noble metal (platinum or palladium) and a metal oxide and activates mainly the partial oxidation of methanol. However, the catalyst system described here cannot be used for the autothermal reforming of hydrocarbons since decomposition or reduction of the base metal oxides (CuO, ZnO) and consequently alloy formation with the noble metal component occurs as a result of the high temperatures, so that long-term stability is not guaranteed.

EP 1 157 968 A1 presents a process for the autothermal steam reforming of hydrocarbons which is operated adiabatically and requires a noble metal catalyst on a support body.

Furthermore, WO 02/18269 A2 describes a catalyst unit for hydrogen production which has a layered structure. This catalyst unit comprises a monolith having a layer containing a steam reforming catalyst (SR catalyst). This layer is in turn in contact with a layer containing a catalyst for partial oxidation (CPO catalyst). In a preferred embodiment, the layer containing the catalyst for partial oxidation (CPO) is located above the layer containing the steam reforming catalyst. In other words, the lower catalyst layer contains the steam reforming catalyst while the upper layer contains the catalyst for partial oxidation. The applicant has addressed the problem of autothermal reforming of hydrocarbons in detail and has established that the layer sequence described in WO 02/18269 A2 gives low hydrogen yields and thus leads to a low reformer efficiency.

This low reformer efficiency in turn leads to the entire fuel cell drive system (consisting of fuel cell stack, reformer unit and control unit) having a low overall efficiency which is only insignificantly better than that of modern optimized diesel units for passenger cars. In the case of reformers which are used in stationary fuel cell systems, the low efficiency leads to a low total yield of electricity and heat, as a result of which the competitiveness opposite conventional coupled power/heat systems ("CPH systems") is reduced.

However, there is still a need for processes for the autothermal steam reforming of hydrocarbons which give very high hydrogen yields and thus are very well-suited for use in mobile and stationary fuel cell systems. Furthermore, there is a need for catalysts suitable for the process.

The invention provides a catalyst and a process for the autothermal, catalytic steam reforming of hydrocarbons using this catalyst.

The catalyst of the invention has a multilayer coating comprising at least two different catalyst layers, each of which contains at least one platinum group metal on an oxidic support material, on a support body. The multilayer coating has a first, lower catalyst layer which preferentially catalyses the partial oxidation ("CPO" according to eq. (2)) and also a second, upper catalyst layer which mainly displays activity in respect of steam reforming (in accordance with eq. (1)). The order of layers is precisely the opposite of that in WO 02/18269 A2.

In the case of three-layer catalyst arrangements, the catalyst composition can have a further catalyst layer, for example for the carbon monoxide conversion ("water gas shift reaction", WGS reaction), which is applied as third layer over all or part of the second coating. The catalyst layer for the WGS reaction can contain at least one noble metal as catalytically active component. Structures having more than three layers, for example four-layer arrangements, are also possible.

In the process of the invention, a feed mixture of hydrocarbons, oxygen and water or water vapour which has been heated to a preheating temperature is passed over the catalyst, with the reaction being carried out adiabatically. The overall process is a single-stage process, i.e. the feed mixture is passed over a single, multilayer catalyst which is able to provide the energy required for the endothermal steam reforming by means of the catalytic, partial oxidation of the feed mixture. Here, the temperature of the feed mixture rises from the preheating temperature to the required reaction temperature of from 600 to 900° C. Partial oxidation and steam reforming go smoothly over into one another over the catalyst. The sequence of exothermic catalytic, partial oxidation and endothermic steam reforming and subsequent carbon monoxide conversion (WGS reaction) gives a uniform temperature profile in the catalyst without any large temperature fluctuations and peaks.

The catalyst of the invention comprises a support body and a catalyst composition which is applied in the form of a multilayer coating to the geometric surfaces of the support body. Preferred support bodies are monolithic honeycomb bodies comprising ceramic or metal, open-celled ceramic or metallic foams, metal sheets or irregularly shaped components. The total thickness of the catalytic coating is generally in the range from 20 to 200 μm.

In the case of two-layer coating, the catalyst composition comprises a first, lower catalyst layer which preferentially catalyses the partial oxidation and also a second, upper catalyst layer which displays activity in respect of steam reforming. A schematic depiction of a possible structure of the catalyst of the invention is shown in FIG. 1. The catalyst comprises a support body (1) to which a two-layer catalyst composition (2), which in turn comprises a lower layer (3) and an upper layer (4), has been applied. The lower catalyst layer can catalyse the partial oxidation and the upper catalyst layer can catalyse steam reforming.

The two different catalyst layers each contain at least one platinum group metal on a finely divided, oxidic support material. They are thus supported catalysts in which the noble metal is finely dispersed on the oxidic support material. For the purposes of the present invention, the term supported catalyst refers only to the catalyst composition and has to be distinguished from the catalyst comprising the support body (1) with the catalyst composition (2) applied thereto.

The lower catalyst layer (3) which catalyses the partial oxidation preferably contains from 0.1 to 5% by weight of platinum, based on the total weight, as noble metal. Platinum displays a high activity for the oxidation of hydrocarbons. To match the oxidation activity to the requirements of the process, the catalyst composition can additionally contain other noble metals, for example palladium or rhodium. Preference is given to using a catalyst composition comprising platinum on aluminium oxide and oxides of the rare earths.

The upper catalyst layer (4) for steam reforming contains from 0.1 to 5% by weight of rhodium, based on its total weight, as noble metal. Rhodium displays a high activity for steam reforming, and its oxidation activity is at the same time low compared to that of platinum. Preference is given to using a catalyst composition comprising rhodium on an active aluminium oxide. This catalyst layer can additionally contain cerium oxide to reduce carbon deposits and to increase the sulphur resistance.

Figure 2:
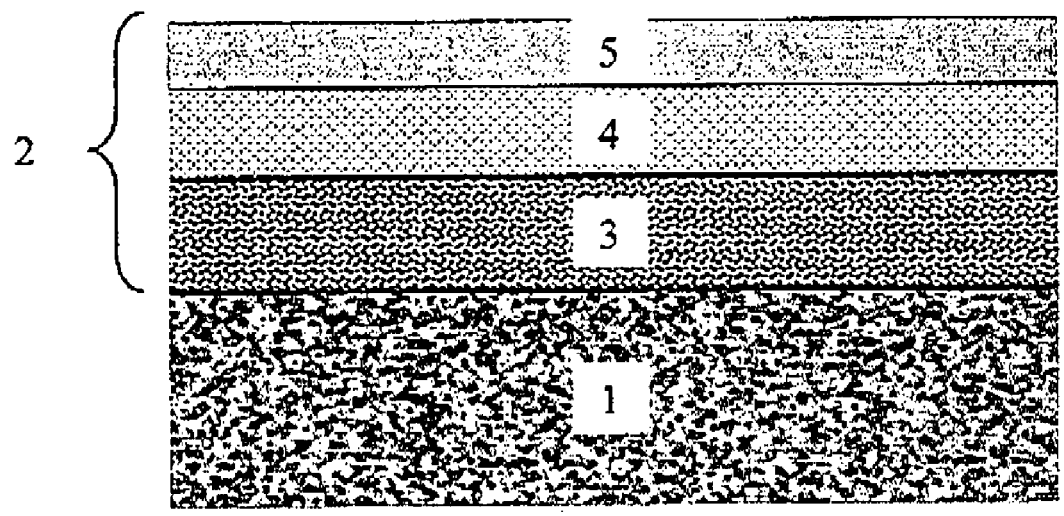

In the case of a three-layer coating, the catalyst composition comprises not only the first, lower catalyst layer (which preferentially catalyses the partial oxidation) and a middle catalyst layer (which is active in respect of steam reforming) but also a third layer which catalyses the conversion of carbon monoxide (CO) (the WGS reaction). A schematic depiction of a possible structure of the catalyst of the invention is shown in FIG. 2. The catalyst comprises a support body (1) to which a three-layer catalyst composition (2) which in turn comprises a lower layer (3), a middle layer (4) and an upper layer (5) has been applied. The lower catalyst layer can catalyse the partial oxidation, the middle catalyst layer can catalyse steam reforming and the upper layer can catalyse the WGS reaction.

The reaction of carbon monoxide with water to form carbon dioxide and hydrogen in the presence of catalysts is a known method of preparing hydrogen-rich gas mixtures, which is based on the following exothermic reaction:

$$CO+H_2O \leftrightarrow H_2+CO_2; \Delta H > 0 \qquad (4)$$

The reaction according to the reaction equation (4) will hereinafter be referred to as carbon monoxide conversion or CO-conversion. In English language, the term "water gas shift reaction" (WGS reaction) is frequently used.

In the present case of the three-layer catalyst system, preference is given to using a shift catalyst containing noble metals for the high-temperature WGS reaction having a working temperature of from 280 to 550° C. Such shift catalysts are known from EP 1 136 441 A2 of the present applicant. They comprise at least one of the noble metals platinum, palladium, rhodium, ruthenium, iridium, osmium and gold on an oxidic support material selected from the group consisting of aluminium oxide, silicon dioxide, titanium oxide, rare earth oxides and mixed oxides thereof and zeolites. Preference is given to using a WGS reaction catalyst based on platinum, palladium and iron.

In the high-temperature CO-conversion, the reformate gas usually contains from 2 to 40% by volume of carbon monoxide and has an entry temperature resulting from the reforming process of from 300 to 600° C.

Possible oxidic support materials for the platinum group metals are, for example, oxides such as aluminium oxide, silicon dioxide, titanium dioxide or mixed oxides thereof and zeolites. Preference is given to using materials having a specific surface area of greater than 10 m²/g in order to make very fine dispersion of the catalytically active components on this large surface area possible. The techniques for producing such as supported catalyst and for coating an inert support body therewith are known to those skilled in the art.

To increase the thermal stability of the catalyst composition, it can additionally contain at least one oxide selected from among boron oxide, bismuth oxide, gallium oxide, oxides of the alkali metals, oxides of the alkaline earth metals, oxides of the transition elements and oxides of the rare earth metals, for example in a concentration of up to 70% by weight, based on the total weight of the catalyst composition.

The multilayer catalyst of the invention has considerable advantages over conventional catalysts. Thus, the inventors have established that, surprisingly, the partial oxidation of the feed mixture is damped down at the entry into the catalyst as a result of the application of the upper catalyst layer (for steam reforming) on top of the lower, oxidation-active layer. As a result, high-temperature peaks which could destroy the catalyst are avoided. The application of a third catalytically active layer for the CO-conversion (WGS reaction) additionally increases the yield of hydrogen and reduces the content of residual hydrocarbons.

The process of the invention can be operated using aliphatic and/or aromatic hydrocarbons (methane, propane, toluene, etc.) or hydrocarbon mixtures (e.g. natural gas, petroleum spirit, heating oil or diesel oil). Depending on the hydrocarbon used, it can be carried out at steam/hydrocarbon ratios S/C of from 0.7 to 5. The air index λ of the feed mixture and its preheating temperature should be selected so that a temperature in the range from 600 to 900° C. is established at the outlet of the catalyst.

The proposed process represents only part of a total process for obtaining hydrogen from mobile and stationary fuel cell units. The total process comprises not only the autothermal reforming but also further process stages for the removal of carbon monoxide from the reformate, for example by preferential oxidation of CO (PrOx), methanization or external, low-temperature WGS reaction.

To achieve quick start-up of the reformer system, the feed mixture can also be heated electrically for a short time. The low thermal mass of the catalyst advantageously leads to full hydrogen production commencing after only a few seconds.

Further embodiments of the present invention relate to graduated catalyst arrangements.

In the case of graduated catalyst arrangements, the catalyst composition can have been applied to a monolithic support body which has a length L and through which flow channels run from an entry end face to an exit end face and contain a lower catalyst layer located directly on the support body and an upper catalyst layer located on the lower catalyst layer. The lower layer is applied over the total length L of the support body and the upper layer is applied only to a particular segment, for example the part of the support body nearest the exit. The precise sequence of layers depends on the construction, the geometry and the mode of operation of the reformer system.

The following examples and the comparative example illustrate the subject matter of the invention. However, the invention is not restricted to these embodiments.

EXAMPLES

Example 1

Two-Layer Catalyst (According to the Invention)

Methane is reformed by the process of the invention using a two-layer catalyst. The catalyst is a catalytically coated ceramic honeycomb body having a cell density of 62 cells/cm² and a volume of 30 ml.

The lower layer of the two-layer catalyst consists of a platinum/aluminium oxide/cerium oxide/zirconium oxide supported catalyst (for CPO). The upper layer of the catalyst consists of a rhodium/aluminium oxide supported catalyst (for SR). The total concentration of the catalytic coating is 150 g/l; the coating concentration of the noble metals is 0.5 g/l of platinum and 0.5 g/l of rhodium.

To carry out the autothermal reforming, the starting materials are heated to 600° C. and then passed together over the catalyst. The following streams are used:

| | |
|---|---|
| Methane: | 152 g/h |
| Water: | 454 g/h |
| Air: | 319 std l/h |

The entry temperature of the mixture is 610° C., and the exit temperature is 645° C. The dry reformate of the two-layer catalyst contains 45.9% by volume of hydrogen, compared to 44.5% by volume in the dry reformate of the two-layer catalyst of Comparative Example 1 (CE1). The CO content is only 4.1% by volume. The results are shown in Table 1.

Comparative Example 1

CE1

Two-layer Catalyst (According to WO 02/18269 A2; not According to the Invention)

Methane is reformed by the process of the invention as described in Example 1 using a two-layer catalyst. The catalyst is a catalytically coated ceramic honeycomb body having a cell density of 62 cells/cm² and a volume of 30 ml.

In accordance with WO 02/18269 A2, the sequence of layers of Example 1 is reversed. The upper layer of the two-layer catalyst consists of a platinum/aluminium oxide/cerium oxide/zirconium oxide supported catalyst (for CPO). The lower layer of the catalyst consists of rhodium/aluminium oxide supported catalyst (for SR). The total concentration of the catalytic coating is 150 g/l; the coating concentration of the noble metals is 0.5 g/l of platinum and 0.5 g/l of rhodium.

To carry out the autothermal reforming, the starting materials are heated to 600° C. and then passed together over the catalyst. The following streams are used:

| Methane: | 152 g/h |
|---|---|
| Water: | 454 g/h |
| Air: | 319 std l/h |

The entry temperature of the mixture is 610° C., and the exit temperature is 645° C. The dry reformate of the two-layer catalyst which is not according to the invention contains 44.5% by volume of hydrogen, compared to 45.9% by volume in the dry reformate of the two-layer catalyst according to the invention in Example 1. The results are shown in Table 1. The superiority of the novel sequence of layers of the two-layer catalyst system according to the invention can be seen.

Comparative Example 2

CE2

Single-Layer Catalyst (not According to the Invention)

As a further comparative examples a catalytically coated ceramic honeycomb body having a cell density of 62 cells/cm² and a volume of 30 ml is likewise used. The catalytic coating in the single-layer system consists of a rhodium/aluminium oxide supported catalyst and is applied in a concentration of 150 g/l to the honeycomb body.

The coating concentration of rhodium is 1 g/l. Methane is reformed by the process described in Example 1.

To carry out the autothermal reforming, the starting materials are once again heated to 600° C. and then passed together over the catalyst. The streams of methane, water and air are identical to those in Example 1.

The entry temperature is 605° C. and the exit temperature is 640° C. The dry reformate of the single layer catalyst contains 43.4% by volume of hydrogen (compared to 45.9% by volume in the case of the two-layer catalyst according to the invention in Example 1. The concentrations of undesired CO (4.8% by volume) and residual methane (1.7% by volume) are significantly higher. The results are likewise shown in Table 1. The superiority of the multilayer catalyst system of the invention can be seen.

Example 2

Three-Layer Catalyst (According to the Invention)

Methane is reformed by the process of the invention using a three-layer catalyst. The catalyst is a catalytically coated ceramic honeycomb body having a cell density of 62 cells/cm² and a volume of 30 ml.

The lower layer consists of a platinum/aluminium oxide/cerium oxide/zirconium oxide supported catalyst (for CPO). The middle layer of the catalyst consists of a rhodium/aluminium oxide supported catalyst (for SR). The upper layer consists of a WGS reaction catalyst and is applied in the last third of the volume segment (viewed in the flow direction). The catalytically active coating of the WGS reaction catalyst comprises 1.5% by weight of Pt, 1.0% by weight of Pd and 2.4% by weight of Fe applied to aluminium oxide/cerium oxide.

The total concentration of the catalytic coating is 180 g/l; the coating concentration of the noble metals is 0.8 g/l of platinum, 0.2 g/l of palladium and 0.5 g/l of rhodium.

To carry out the autothermal reforming, the starting materials are heated to 600° C. and then passed together over the catalyst. The following streams are used:

| Methane: | 152 g/h |
|---|---|
| Water: | 454 g/h |
| Air: | 319 std l/h |

The entry temperature of the mixture is 605° C. and the exit temperature is 630° C. The dry reformate of the three-layer catalyst contains 46.3% by volume of hydrogen. The CO content is only 3.7% by volume. The results are shown in Table 1. The superiority of the three-layer catalyst system according to the invention can be seen.

TABLE 1

Results from the multilayer catalysts according to the invention compared to a multilayer catalyst having a different sequence of layers (CE1) and to a conventional single-layer catalyst (CE2) in the autothermal reforming of methane

| | $H_2$ (% by volume) | $CO_2$ (% by volume) | CO (% by volume) | Residual methane (% by volume) |
|---|---|---|---|---|
| Example 1 | 45.9 | 13.8 | 4.1 | 1.0 |
| Comparative Example 1 (CE1, WO 02/18269) | 44.5 | 13.1 | 4.5 | 1.3 |
| Comparative Example 2 (CE2) | 43.4 | 12.7 | 4.8 | 1.7 |
| Example 2 | 46.3 | 14.1 | 3.7 | 1.1 |

The invention claimed is:

1. A catalyst for autothermal catalytic reforming of hydrocarbons, said catalyst comprising:
    (a) a support;
    (b) a multilayer catalyst substance, wherein said multilayer catalyst substance is applied to said support and said multilayer catalyst substance comprises:
        (i) a lower catalyst layer, wherein said lower catalyst layer contacts said support and said lower catalyst layer is capable of preferentially catalyzing partial oxidation; and
        (ii) an upper catalyst layer, wherein said upper catalyst layer is capable of preferentially catalyzing steam reforming; and
    wherein the lower catalyst layer comprises platinum at a concentration of 0.1 to 5% by weight based on the total weight of the catalyst and the upper catalyst layer comprises rhodium at a concentration of 0.1 to 5% by weight, based on the total weight of the catalyst.

2. The catalyst according to claim 1, wherein one or both of the lower catalyst Layer and the upper catalyst layer further comprise a noble metal, a rare earth metal or a base metal of the subgroup elements.

3. The catalyst according to claim 2, wherein one or both of the lower catalyst layer and the upper catalyst layer further comprise a metal of the $8^{th}$ subgroup elements on an oxide support material, wherein said oxide support material comprises a zeolite or an oxide selected from the group consisting of aluminum oxide, silicon dioxide, titanium dioxide, boron oxide, bismuth oxide, gallium oxide, oxides of the alkali metals, oxides of the alkaline earth metals, oxides of the subgroup elements, rare earth oxides, and mixtures thereof.

4. The catalyst according to claim 3, wherein the catalyst substance is located on a monolithic support having a length L and is penetrated from an inlet surface to an outlet surface by flow channels, comprising a lower catalyst layer applied directly on the support and an upper catalyst layer lying on the lower catalyst layer, with the lower catalyst layer applied over the full length of the support and the upper layer applied only to part of the lower catalyst layer.

5. The catalyst according to claim 4, wherein said catalyst further comprises a third catalyst layer, wherein said third catalyst layer is capable of carbon monoxide conversion and is applied to part of the upper catalyst layer.

6. The catalyst according to claim 4, wherein the third catalyst layer comprises as catalytically active components at least one noble metal selected from the group consisting of Pt, Pd, Rh, Ru, Ir, Os and Au, and said at least one noble metal is located on an oxide support material which comprises a zeolite or an oxide selected from the group consisting of aluminum oxide, silicon dioxide, titanium dioxide, rare earth oxides, and mixtures thereof.

7. The catalyst according to claim 6, wherein the third catalyst layer further comprises at least one rare earth metal and at least one base metal of the subgroup elements.

8. A process for autothermal catalytic steam reforming of hydrocarbons, said process comprising passing a starting mixture of hydrocarbons, oxygen and water or steam, heated to a preheat temperature, over a multilayer catalyst, wherein said process is operated adiabatically and said multilayer catalyst is comprised of a support and a coating, wherein said coating is comprised of a multilayer catalyst substance in which a lower catalyst layer contacts said support and is capable of preferentially catalyzing partial oxidation and an upper catalyst layer is capable of preferentially catalyzing steam reforming and wherein the lower catalyst layer comprises Platinum at a concentration of 0.1 to 5% by weight based on the total weight of the catalyst and the under catalyst layer comprises rhodium at a concentration of 0.1 to 5% by weight, based on the total weight of the catalyst.

9. The process according to claim 8, wherein the upper catalyst layer and the lower catalyst layer each comprises a metal selected from the $8^{th}$ subgroup elements on an oxide support material, wherein said oxide support material is selected from the group consisting of aluminum oxide, silicon dioxide, titanium dioxide, boron dioxide, bismuth oxide, gallium oxide, oxides of the alkali metals, oxides of the alkaline earth metals, oxides of the subgroup elements, rare earth oxides, mixtures of those oxides, and zeolites at a concentration of up to 70% by weight based on the total weight of the catalyst.

10. A method of autothermal catalytic steam reforming comprising using the catalyst of claim 1.

11. A reformer for catalytic steam reforming of hydrocarbons to generate hydrogen for a fuel cell system, wherein said reformer comprises the catalyst of claim 1.

* * * * *